(No Model.)
J. STUBBS.
ICE SHAVER.
No. 482,883. Patented Sept. 20, 1892.
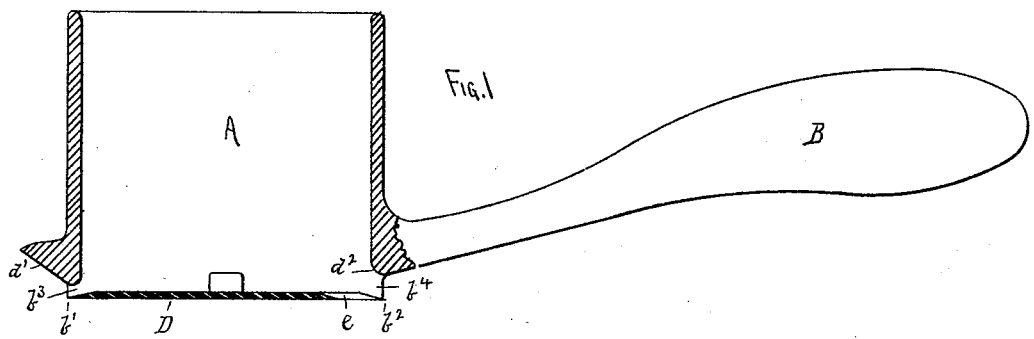
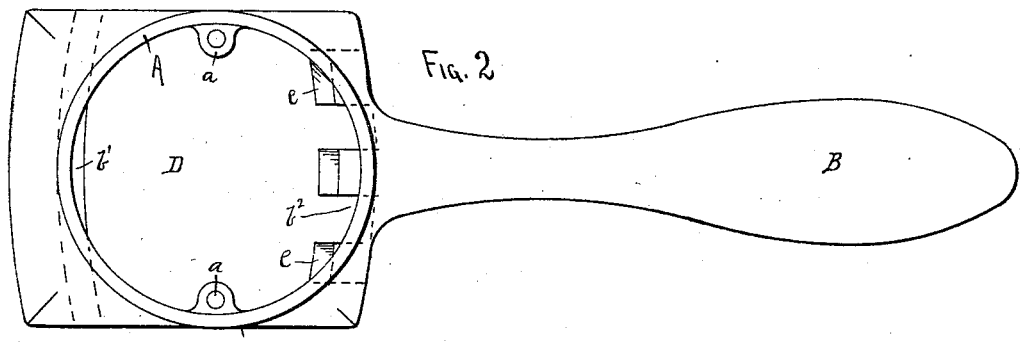
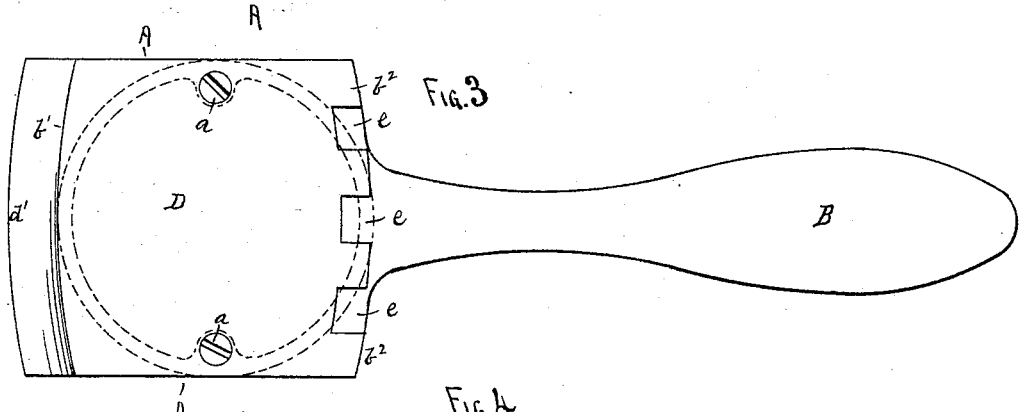
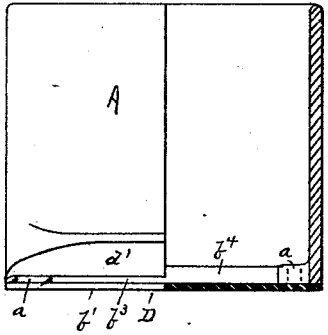
WITNESSES
H. N. Gardiner
C. F. Toweth
Joel Stubbs,
INVENTOR, BY
Charles N. Woodward
Atty.

UNITED STATES PATENT OFFICE.

JOEL STUBBS, OF LONG LAKE, MINNESOTA.

ICE-SHAVE.

SPECIFICATION forming part of Letters Patent No. 482,883, dated September 20, 1892.

Application filed November 7, 1891. Serial No. 411,139. (No model.)

*To all whom it may concern:*

Be it known that I, JOEL STUBBS, a citizen of the United States, residing at Long Lake, in the county of Hennepin and State of Minnesota, have invented certain new and useful Improvements in Ice-Shaves, of which the following is a specification.

This invention relates to implements for shaving ice for use in beverages and for other purposes requiring ice in small fragments; and it consists in the construction and arrangement of parts, as hereinafter shown and described, and specifically pointed out in the claim.

In the drawings, Figure 1 is a sectional side elevation. Fig. 2 is a top plan view, and Fig. 3 is a bottom plan view. Fig. 4 is a semi-sectional front elevation, the right-hand half of the figure being in cross-section.

A represents a cup-shaped receiver open at both ends and with a handle B attached to or formed in one piece therewith.

D represents the cutting-blade attached flatwise upon the lower end of the receptacle by screws $a$ or in any other suitable manner, and preferably formed with two cutting-edges $b'$ $b^2$, the cutting-edge $b'$ having a space $b^3$ for the entrance of the shaved ice into the receptacle, while the cutting-edge $b^2$ has a somewhat larger space $b^4$ for the passage of the shaved ice, so that when drawn over the ice in one direction a thicker shaving of ice will be cut than when drawn in the other direction. By this means the shavings may cut thick or thin, as preferred.

The receptacle A is formed with lips $d'$ $d^2$, projecting over the cutting-edges of the blade D, inclining upward and outward to form guards to regulate the depth of the cut of the implement. This makes a very complete and simple implement which is not liable to get out of order or become otherwise disarranged by use.

The blade lying flatwise upon the lower side of the receptacle serves the double purpose of a cutting-blade for the implement and as a bottom to the receptacle. Its position also renders it very easy to sharpen the cutting-edges without detaching the blade from the receptacle.

Another advantage of arranging the cutting-blade in the manner shown is that it can be formed the full width of the receptacle, and thus not only cut its full width, but also prevent the formation of hollows or "ruts." The cutting-edges being placed at substantially the outer edges of the receptacle enables me to use the implement upon all parts of the cakes of ice, no matter what its location may be.

The cutting-blade is shown with notches or serrations $e$ on the edge $b^2$; but these may be employed or not, as preferred.

Having thus described my invention, what I claim as new is—

In an ice-shave, the receptacle A, having the handle B and open at both ends and formed with lips $d'$ $d^2$, said lips having their downward surfaces inclined outward and upward, in combination with blade D, forming the bottom of said receptacle, and with cutting-edges $b'$ $b^2$, substantially as and for the purpose set forth.

In testimony whereof I have hereunto set my hand in the presence of two subscribing witnesses.

JOEL STUBBS.

Witnesses:
C. N. WOODWARD,
CHAS. B. STEVENS.